(12) United States Patent
Fernandez Luque et al.

(10) Patent No.: US 10,749,463 B2
(45) Date of Patent: Aug. 18, 2020

(54) PHOTOVOLTAIC SYSTEM FOR GENERATING ELECTRICITY WITH AN AUXILIARY CHARGING MODULE

(71) Applicant: SOLTEC ENERGIAS RENOVABLES, S.L., Molina de Segura (ES)

(72) Inventors: Francisco Jesus Fernandez Luque, Pozoblanco (ES); Jose Antonio Villarejo Manas, Cartagena (ES); Jose Angel Gracia Ingles, Los Alcazares (ES)

( * ) Notice: Subject to any disclaimer, the term of this patent is extended or adjusted under 35 U.S.C. 154(b) by 0 days.

(21) Appl. No.: 16/233,199

(22) Filed: Dec. 27, 2018

(65) Prior Publication Data

US 2019/0222167 A1 Jul. 18, 2019

(30) Foreign Application Priority Data

Jan. 18, 2018 (EP) ........................................ 8382022

(51) Int. Cl.
*H02S 20/32* (2014.01)
*H02S 40/30* (2014.01)
*H02S 40/32* (2014.01)
*H02S 40/38* (2014.01)
*H02J 7/35* (2006.01)
(Continued)

(52) U.S. Cl.
CPC ................ *H02S 20/32* (2014.12); *H02J 1/12* (2013.01); *H02J 7/35* (2013.01); *H02S 40/30* (2014.12); *H02S 40/32* (2014.12); *H02S 40/38* (2014.12); *H02J 3/383* (2013.01); *H02M 3/33523* (2013.01)

(58) Field of Classification Search
CPC .... H02J 7/35; H02J 3/381; H02J 3/383; H02J 2300/24; H02J 1/12; H02M 3/33523; H02S 40/30; H02S 20/32; H02S 40/32; H02S 40/38
See application file for complete search history.

(56) References Cited

U.S. PATENT DOCUMENTS 5,779,817 A * 7/1998 Wecker ...................... B60J 7/04
136/244
5,959,432 A * 9/1999 Saurer ....................... H02J 7/35
320/101

(Continued)

*Primary Examiner* — Golam Mowla
(74) *Attorney, Agent, or Firm* — Eugenio J. Torres-Oyola; Victor M. Rodriguez-Reyes; Rafael Rodriguez-Muriel

(57) ABSTRACT

A photovoltaic system or installation, for generating electricity, which includes auxiliary charging modules for each solar tracker of the photovoltaic system to charge or supply energy to an auxiliary power supply device such as a battery, in order to power the photovoltaic system during the initial stages of the set-up process of the electric energy generation plant or during incidences in the normal operation of the photovoltaic system or installation.

In addition to the auxiliary charging modules, the photovoltaic system comprises: one or more solar trackers, wherein each solar tracker comprises a plurality of photovoltaic panels, a DC/AC inverter to transform the DC electricity generated into AC electricity which is then supplied to an electric grid or an electric power distribution system, and a solar tracker controller, for each solar tracker, which controls several aspects of the one or more solar trackers of the photovoltaic system.

8 Claims, 3 Drawing Sheets

(51) Int. Cl.
*H02J 1/12* (2006.01)
*H02J 3/38* (2006.01)
*H02M 3/335* (2006.01)

(56) References Cited

U.S. PATENT DOCUMENTS

| | | | | |
|---|---|---|---|---|
| RE43,572 E | * | 8/2012 | West | H02M 1/10 |
| | | | | 307/64 |
| 8,933,321 B2 | * | 1/2015 | Hadar | H01L 31/02021 |
| | | | | 136/244 |
| 2006/0132102 A1 | * | 6/2006 | Harvey | G05F 1/67 |
| | | | | 320/166 |
| 2008/0164766 A1 | * | 7/2008 | Adest | H02J 1/12 |
| | | | | 307/80 |
| 2009/0027932 A1 | * | 1/2009 | Haines | H02J 9/062 |
| | | | | 363/95 |
| 2009/0183763 A1 | * | 7/2009 | Meyer | H01L 31/02021 |
| | | | | 136/246 |
| 2009/0316458 A1 | * | 12/2009 | Gonzalez Senosiain | |
| | | | | H02J 3/383 |
| | | | | 363/132 |
| 2012/0055529 A1 | * | 3/2012 | Hung | H01L 31/02021 |
| | | | | 136/244 |
| 2012/0313440 A1 | * | 12/2012 | Watelmacher | H02S 40/30 |
| | | | | 307/77 |
| 2014/0197684 A1 | * | 7/2014 | Masato | H02J 7/35 |
| | | | | 307/9.1 |
| 2016/0322829 A1 | * | 11/2016 | Klein | H02S 40/36 |
| 2017/0070085 A1 | * | 3/2017 | Cher | H02J 7/0045 |

* cited by examiner

PHOTOVOLTAIC SYSTEM FOR GENERATING ELECTRICITY WITH AN AUXILIARY CHARGING MODULE

TECHNICAL FIELD

The present invention relates to a photovoltaic system for generating electricity, wherein said system includes an auxiliary charging module which enables said system to be powered by the electricity generated by at least one photovoltaic panel, from a plurality of photovoltaic panels connected in series arranged on a solar tracker.

Furthermore, the auxiliary charging module may be connected to one or more solar trackers, wherein each solar tracker comprises a plurality of photovoltaic panels. Through the use of a switch, included in the auxiliary charging module, the electric wiring which connects the plurality of photovoltaic panels to said auxiliary charging module can be modified.

Specifically, at least one photovoltaic panel from the plurality of photovoltaic panels connected in series may vary between a series and a parallel connection to the auxiliary charging module, and therefore generating and/supplying electric current to a battery of the auxiliary charging module.

STATE OF THE ART

In the present state of the art, an installation for powering auxiliary equipment in electrical energy generation plants is known, as seen in patent application n° WO 2017/174829 A1, wherein the installation generates a direct current (DC) through the use of a plurality of electric generators, such as photovoltaic panels (PV1 . . . PVn) connected in series, which then supplies the DC electricity generated to an auxiliary power supply device (D) wherein said auxiliary power supply device (D) powers an auxiliary device (E), wherein said auxiliary device (E) may be a battery, a tracker controller for solar trackers (which comprise one or more photovoltaic panels) of a solar park or installation.

Furthermore, the auxiliary power supply device (D) comprises a DC power converter (CP) which allow the voltage to be outputted to be adjusted according to the battery or other auxiliary device (E) it must then supply.

However, this configuration is limited as it only allows the electric generators (PV panels) to be connected in series to the auxiliary power supply device (D), unlike the invention herein disclosed.

When the electric energy generation plant and the different components of said installation, are either still not connected to the electric grid or in a fully operational mode, the auxiliary power supply device (D) can't obtain energy generated by the electric generators or any other external power source, and therefore they will only operate until the energy stored in the auxiliary power supply device (D) has been discharged.

Therefore, during the initial stages when the generation plants require a continuous supply of energy in order to be fully operational it is necessary for electric generators, specifically solar trackers harnessing a plurality of photovoltaic panels when the electric energy generation plant is a photovoltaic system, to be operational for several days using only the energy stored in a battery or other auxiliary power supply device.

In order to solve these issues, according to this invention an auxiliary charging module (also known as a serial battery charger (SBC)) is integrated in the photovoltaic system, connecting the electric generators (PV panels) to the auxiliary power supply device.

The auxiliary charging module includes a switch or commutation device which enables the plurality of photovoltaic panels, usually connected in series to the auxiliary power supply device, to modify their electric configuration wherein at least one photovoltaic panel is connected in parallel to the auxiliary power supply device in order to supply electric current generated by these photovoltaic panels connected in parallel to charge the battery and power the photovoltaic system during the initial stages of the set up process of the electric energy generation plant.

BRIEF DESCRIPTION OF THE INVENTION

In view of the problems cited previously, the present invention provides a photovoltaic system or installation, for generating electricity, which includes an auxiliary charging module for each solar tracker of the photovoltaic system to charge or supply energy to an auxiliary power supply device such as a battery, in order to power the photovoltaic system during the initial stages of the set-up process of the electric energy generation plant or during incidences in the operation of the photovoltaic system or installation.

In addition to the auxiliary charging module, the photovoltaic system comprises:
- one or more solar trackers, wherein each solar tracker comprises a plurality of photovoltaic panels which are connected in series (string) and provide a direct current DC power supply;
- a DC/AC inverter to transform the DC electricity generated by said plurality of photovoltaic panels into alternating current (AC) electricity which is then supplied to an electric grid or an electric power distribution system; and
- a solar tracker controller, for each solar tracker, which controls several aspects of the one or more solar trackers of the photovoltaic system such as, rotating the solar trackers to reduce the angle of incidence between the light emitted by the sun at any moment and the plurality of photovoltaic panels of each solar tracker to increase the energy generated.

The aforementioned auxiliary charging module includes several components, as well as the battery, to store or supply electricity, connected to the DC/DC converter to assist the photovoltaic system in certain specific periods when electric current is required. The main components are a DC/DC converter, also known as in-series battery charger, connected to the plurality of photovoltaic panels, and a control unit controlling at least one switch to modify the electrical connection of the plurality of photovoltaic panels of at least one solar tracker, connected to the DC/DC converter to accumulate electric energy and/or charge the battery and/or supply electric energy to the photovoltaic system during these certain specific periods during the initial stages of the set up process of the electric energy generation plant.

The DC/DC converter allows the conversion from one voltage level to another more suitable for the battery or other components it must then supply from the photovoltaic system, as the direct current generated by the plurality of photovoltaic panels may reach high voltage levels which can damage certain electric components.

In some embodiments, the auxiliary charging module may further comprise a second isolated DC/DC converter connected in parallel with the DC/DC converter and the battery, and a data interface between the solar tracker controller and the control unit of the auxiliary charging module which allow them to exchange information, data and/or orders which relate to their surroundings, the positioning of the solar trackers or the need to modify the electrical configuration of the wiring which connects the plurality of photovoltaic panels to the DC/DC converter and the battery of the auxiliary charging module.

In some embodiments of the invention, the use of a switch depending on a control unit may not be necessary. The auxiliary charging module may change the electric configuration of the photovoltaic panels connected to the battery, from series to parallel through the use of a remote communication by means of a gateway and the data interface.

In order for the auxiliary charging module to charge or supply energy to the battery to power the photovoltaic system during the initial stages of the set up process of the electric energy generation plant, the plurality of photovoltaic panels connected to the DC/DC converter comprise a first and a second configuration, wherein the control unit through the use of a switch or commutation device, determines when said first and second configurations are set as the predetermined configuration of the photovoltaic system. The switch or commutation device may be a semiconductor or a power transistor (taking into account that values 1000 V to 1500 V can be achieved) or any other device known in the state of the art which allows the photovoltaic panels connected to auxiliary charging module to vary between a serial or a parallel configuration.

Said first configuration, is the default configuration of the photovoltaic system, in which the plurality photovoltaic panels, of at least one solar tracker, are connected in series with the DC/DC converter of the auxiliary charging module which is in turn connected to the battery storing energy On the other hand, the second configuration, in which at least one of the PV panels is connected in parallel with the DC/DC converter of the auxiliary charging module and subsequently to the battery, the latter being enabled to supply energy to the photovoltaic system when requested during certain specific periods during the initial stages of the set-up process of the electric energy generation plant.

When the second configuration is used, the PV panel connected in parallel to the auxiliary charging module supply energy to the battery of the photovoltaic system, and the remaining plurality of photovoltaic panels are connected in series and without connection to the auxiliary charging module, and they continue to generate a continuous current which is directed to the DC/AC inverter.

In some embodiments of the invention, when the second configuration is set as the photovoltaic systems configuration, only one photovoltaic panel from the plurality of photovoltaic panels, of at least one solar tracker, is connected in parallel to the DC/DC converter of the auxiliary charging module and therefore to the battery to supply the energy generated by said only one photovoltaic panel to the photovoltaic system.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and not limitative, in which.

DETAILED DESCRIPTION OF AN EMBODIMENT

Figure 1:
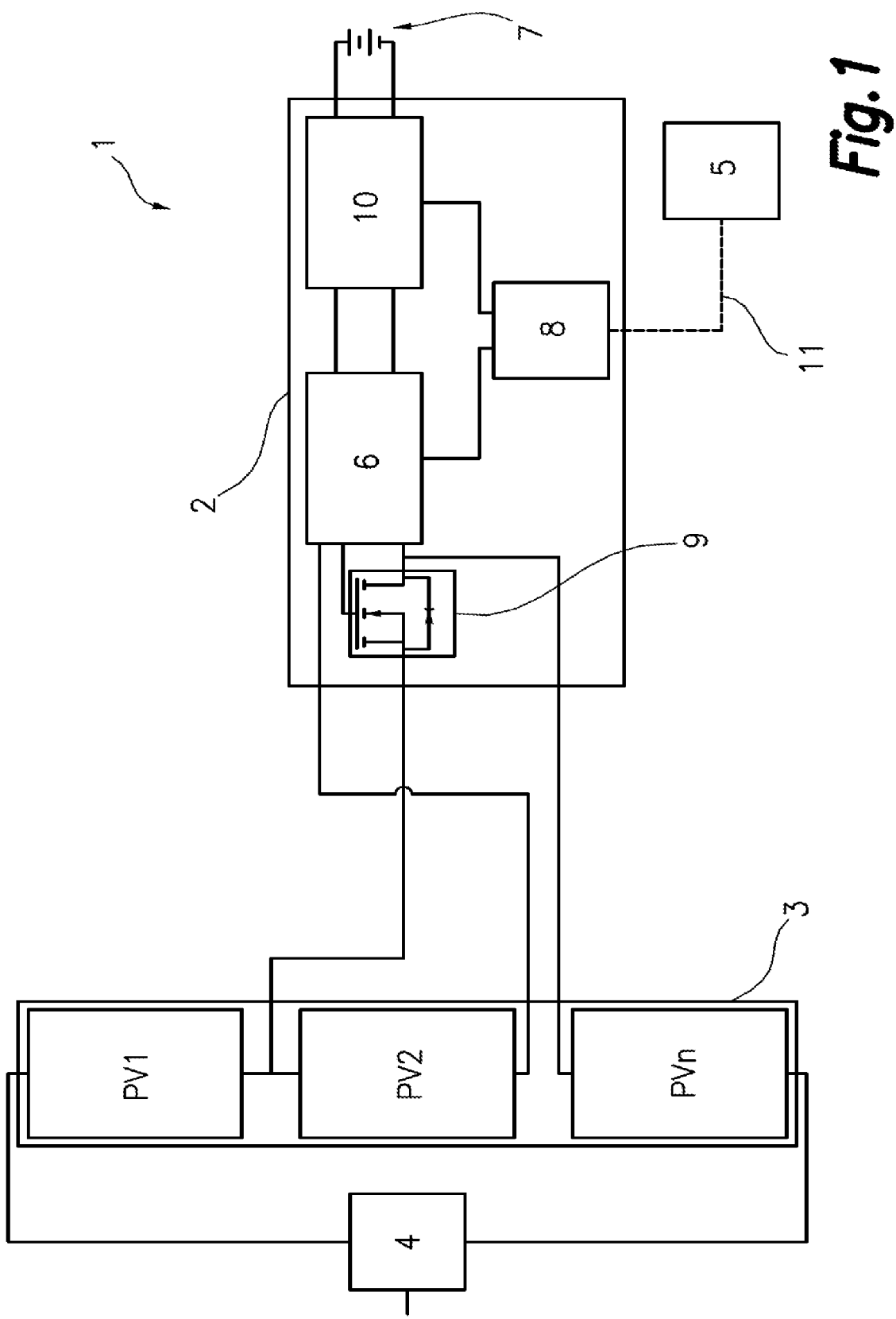
FIG. 1 is a schematic view of a photovoltaic system and the different elements that comprise it.
Figure 2:
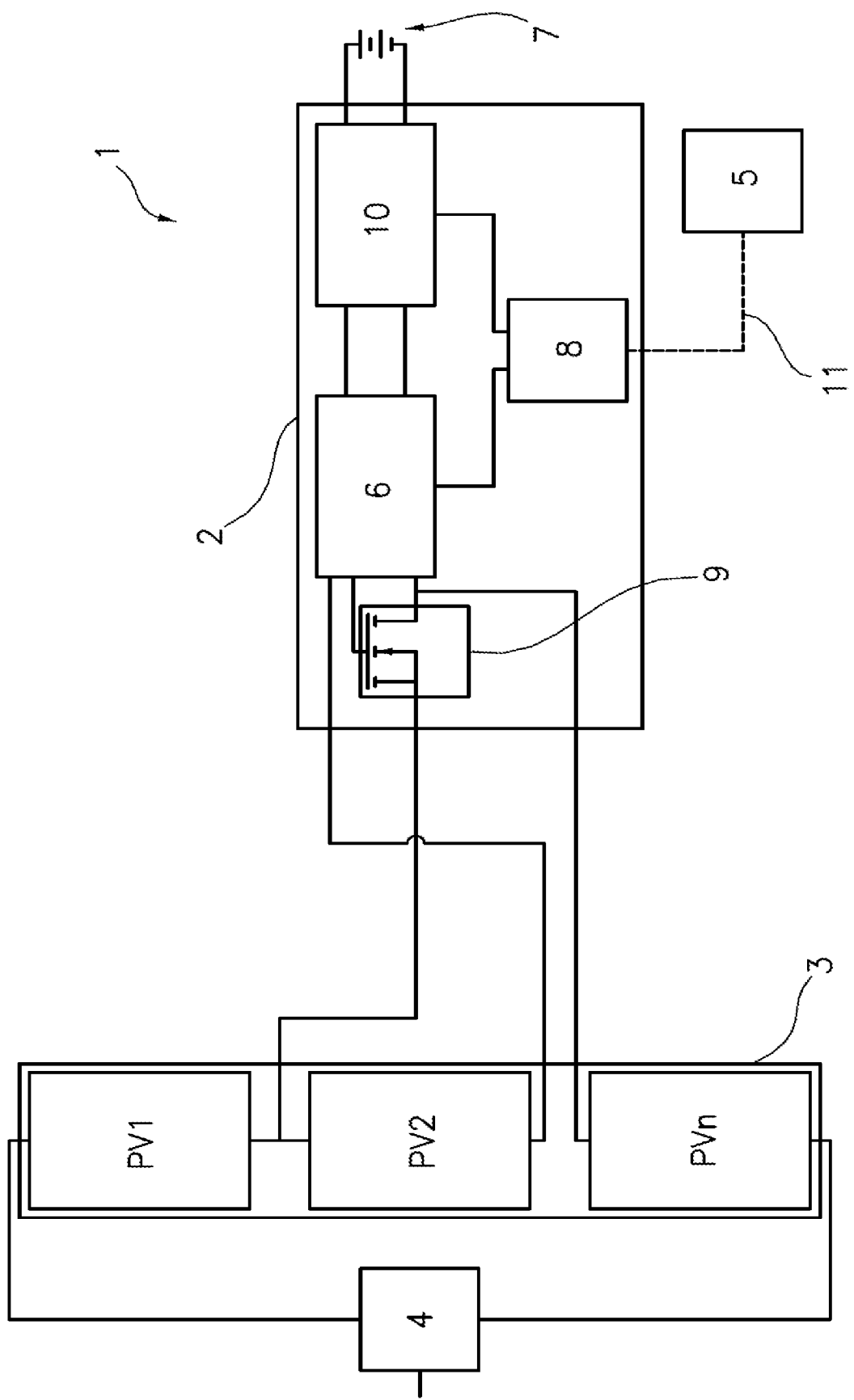
FIG. 2 illustrates the photovoltaic system wherein, the plurality of photovoltaic panels, are connected in series, according to the default configuration.
Figure 3:
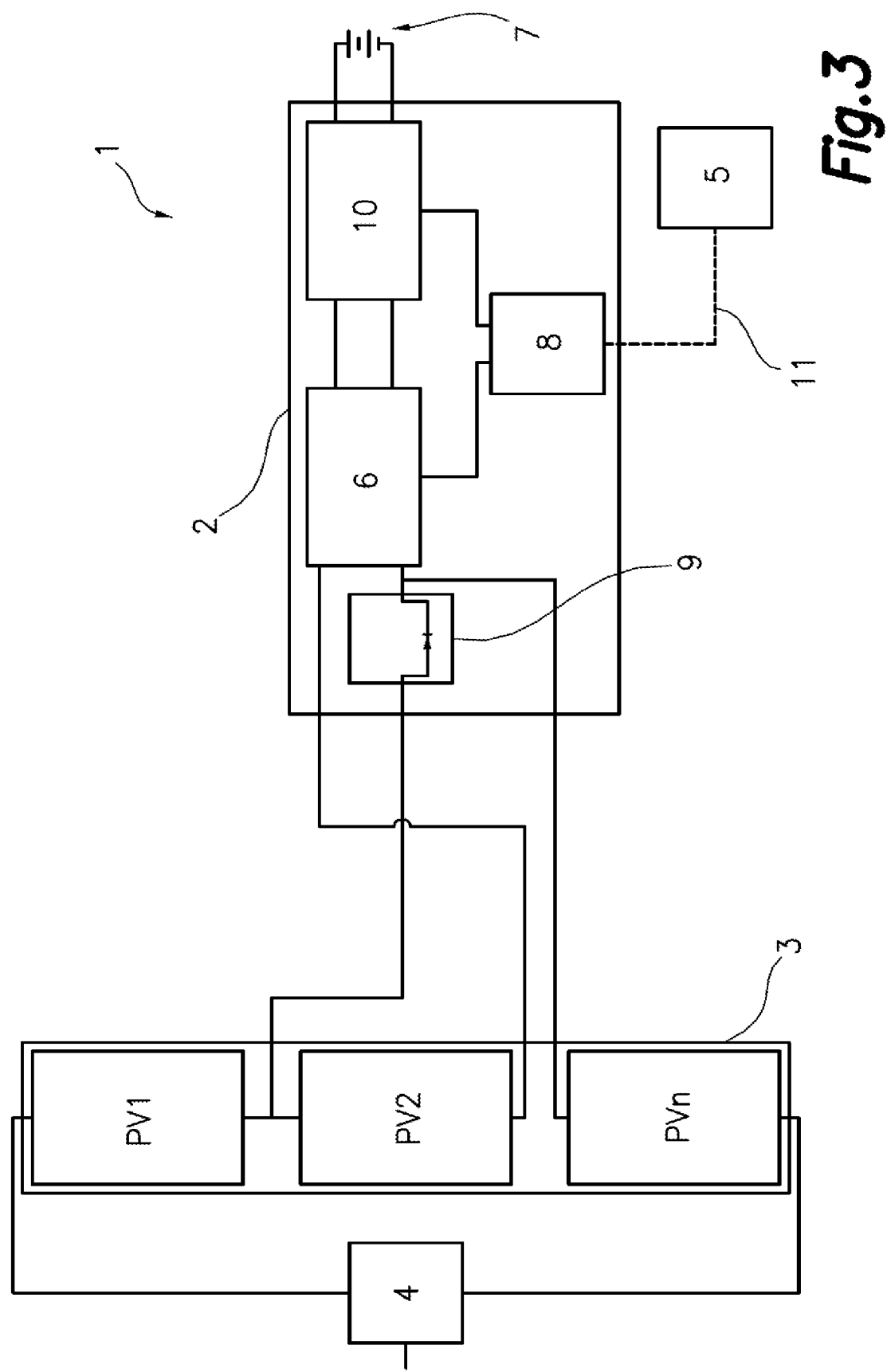
FIG. 3 illustrates the photovoltaic system wherein one of the plurality of photovoltaic panels, are connected in parallel.

The foregoing and other advantages and features will be more fully understood from the following detailed description of an embodiment with reference to the accompanying drawings, to be taken in an illustrative and not limitative, in which:

FIG. 1 is a schematic view of a photovoltaic system 1 and the different elements that comprise it, such as an auxiliary charging module 2. In this particular embodiment the photovoltaic system 1 comprises only one solar tracker 3 which comprises a plurality of photovoltaic panels, PV1 . . . , PVn, which are connected in a first configuration in series (as seen in FIG. 2) or in a second configuration, wherein one of the photovoltaic panels, PV2, is connected in parallel (as seen in FIG. 3), to the DC/DC converter, 6, through the use of a switch 9.

The photovoltaic system also comprises a DC/AC inverter 4 to change the direct current generated by the plurality of photovoltaic panels, PV1 . . . PVn, into alternating current to be supplied to a main electric grid or an electric power distribution system, and a tracker controller 5 which monitors and controls aspects relating to the performance and positioning of the solar tracker 3. The tracker controller 5 is also connected to a control unit 8 integrated in the auxiliary charging module 2 through a data interface 11 which enables a communication to occur between them in order to exchange data, information and orders. The communication between the tracker controller 5 and the control unit 8 determines when the switch 9 must alter the configuration of the plurality of photovoltaic panels PV1 . . . PVn between the first and the second configurations according to the needs of the photovoltaic system 1.

In either the first or the second configuration, the plurality of photovoltaic panels, PV1 . . . PVn, are also connected to the DC/DC converter 6 in order to adjust the voltage level outputted to the subsequent elements of the auxiliary charging module 2, or an auxiliary power supply device such as a battery 7, which is used to both store and supply energy to the photovoltaic system 1 in certain specific periods, when requested.

In certain embodiments of the invention, such as this one, the auxiliary charging module 2 may include a second isolated DC/DC converter 10 connected in parallel with the first DC/DC converter 6, and the battery 7.

FIG. 2 illustrates the photovoltaic system wherein, the plurality of photovoltaic panels, are in the first configuration and therefore connected in series. This first configuration is the default configuration for the plurality of photovoltaic panels, PV1 . . . PVn, of each solar tracker 3 and shows their connection to the auxiliary charging module 2 and battery 7, of the photovoltaic system 1. As in FIG. 1, this particular embodiment of the invention only has one solar tracker 3.

When the first configuration is used as the set configuration for the photovoltaic panels, PV1 . . . PVn, of the photovoltaic system 1 the switch 9 is in a first position, set by the control unit 8 in communication with the tracker controller 5 through the data interface 11, which enables all the photovoltaic panels PV1 . . . PVn to be connected in series with the DC/DC converter 6 of the auxiliary charging module 2.

Whereas, in FIG. 3 at least one of the photovoltaic panels, in this particular embodiment photovoltaic panel PV2, is connected to the auxiliary charging module and in parallel with the auxiliary charging module 2 and the remaining photovoltaic panels continue to generate DC electricity to be directed towards the DC/AC inverter 4.

For the second configuration, the switch 9 is in a second position set by the control unit 8, and the photovoltaic panel PV2 is connected in parallel to the DC/DC converter 6 of the auxiliary charging module 2 in order to supply the DC electricity generated by said panel PV2 to the battery 7 in order to power the photovoltaic system 1.

It will be understood that various parts of one embodiment of the invention can be freely combined with parts described in other embodiments, even being said combination not explicitly described, provided there is no harm in such combination.

What is claimed is:

1. A photovoltaic system for generating electricity, comprising:
    one or more solar trackers, wherein each solar tracker comprises a plurality of photovoltaic panels connected in series;
    a DC/AC inverter to provide a direct current supply generated by said plurality of photovoltaic panels;
    a solar tracker controller and an auxiliary charging module for each solar tracker;
    wherein said auxiliary charging module includes, at least:
    a DC/DC converter;
    a battery, to store electric energy, connected to the DC/DC converter to assist the photovoltaic system in specific periods; and
    a control unit controlling at least one switch to modify the electrical connection of the plurality of photovoltaic panels connected to the DC/DC converter to accumulate electric energy, in the battery, or to supply electric energy to the photovoltaic system in said specific periods,
    wherein the plurality of photovoltaic panels connected to the DC/DC converter comprise:
    a first configuration, in which the plurality photovoltaic panels are connected in series with the DC/DC converter of the auxiliary charging module storing energy; and
    a second configuration in which at least one of the PV panels is connected in parallel with the DC/DC converter of the auxiliary charging module and subsequently to the battery, the latter being enabled to supply energy to the photovoltaic system and the remaining photovoltaic panels are connected in series without connection to the auxiliary charging module; and
    wherein the control unit, through the use of a switch device, determines when said first and second configurations are set as the predetermined configuration of the photovoltaic system.

2. The photovoltaic system according to claim 1, wherein the first configuration is the default configuration of the photovoltaic system.

3. The photovoltaic system according to claim 1, wherein in the second configuration, the PV panels connected in parallel also supply energy to the photovoltaic system, and the remaining plurality of photovoltaic panels continue to generate a continuous current which is directed to the DC/AC inverter.

4. The photovoltaic system according to claim 1, wherein said switch is a semiconductor.

5. The photovoltaic system according to claim 4, wherein the switch is a power transistor.

6. The photovoltaic system according to claim 1, wherein the auxiliary charging module further comprises a second isolated DC/DC converter connected in parallel with the DC/DC converter, and a data interface between the solar tracker controller and the control unit of the auxiliary charging module.

7. The photovoltaic system according to claim 1, wherein in the second configuration, only one photovoltaic panel from the plurality of photovoltaic panels is connected in parallel to the DC/DC converter.

8. The photovoltaic system according to claim 1, wherein the auxiliary charging module changes the electric configuration of the photovoltaic panels connected to the battery, from series to parallel through the use of a remote communication by means of a gateway and a data interface.

* * * * *